United States Patent [19]
Jellison

[11] Patent Number: 5,195,785
[45] Date of Patent: Mar. 23, 1993

[54] ADAPTER FOR CUSTOMIZING GAS TANK FILL FITTINGS

[76] Inventor: Billy L. Jellison, 1160 W. Milton St., Alliance, Ohio 44601

[21] Appl. No.: 797,447

[22] Filed: Nov. 18, 1991

[51] Int. Cl.⁵ .............................................. F16L 15/08
[52] U.S. Cl. ........................................ 285/80; 285/87; 285/92; 285/392; 285/175; 411/940
[58] Field of Search ............... 285/12, 80, 81, 87, 285/92, 175, 392, 355, 390, 914; 220/86.2, 288, DIG. 33; 222/568, 567; 137/385, 383; 411/940, 911, 927; 141/384, 367, 378, 383, 386

[56] References Cited

U.S. PATENT DOCUMENTS

| | | | |
|---|---|---|---|
| 199,108 | 1/1878 | Scofield | 285/392 |
| 417,393 | 12/1889 | McAllister | 285/392 |
| 703,595 | 7/1902 | Kennealy | 285/392 |
| 786,516 | 4/1905 | Phelan | 285/392 |
| 981,180 | 1/1911 | Farmon | 411/315 |
| 1,202,096 | 10/1916 | Poling | 411/940 |
| 1,218,359 | 3/1917 | Beatty | 285/175 |
| 1,240,245 | 9/1917 | Oller | 411/939 |
| 1,287,431 | 12/1918 | Quarles et al. | 411/940 |
| 1,570,155 | 1/1926 | Karbowski | 285/392 |
| 2,044,302 | 6/1936 | Holton | 285/32 |
| 2,548,600 | 4/1951 | Gill | 285/173 |
| 2,805,871 | 9/1957 | Hammon | 285/175 |
| 3,955,835 | 5/1976 | Farrington | 285/175 |
| 4,638,919 | 1/1987 | Frenick | 220/DIG. 33 |
| 4,665,960 | 5/1987 | Brzezicki et al. | 141/384 |

FOREIGN PATENT DOCUMENTS

| | | | |
|---|---|---|---|
| 114982 | 4/1942 | Australia | 285/87 |
| 160006 | 4/1983 | Fed. Rep. of Germany | 285/392 |
| 467627 | 6/1937 | United Kingdom | 285/175 |

*Primary Examiner*—Eric K. Nicholson
*Attorney, Agent, or Firm*—Paul E. Milliken; Lee A. Germain

[57] ABSTRACT

An adapter ring which screws onto a gas tank fill fitting to cover the standard threads on the fitting and provided customized non-standard threads to prevent suppliers without matching fill hose couplings from connecting their supply hose outlet fittings to the fill fittings of tanks which they are not authorized to use. The adapter rings are fastened in place with a thread damaging member which will damage the threads on the fill fitting if there is an attempt to unscrew the adapter ring.

14 Claims, 3 Drawing Sheets

ADAPTER FOR CUSTOMIZING GAS TANK FILL FITTINGS

TECHNICAL FIELD

This invention relates to an adapter for customizing the threads on a fill fitting for gas supply tanks to prevent suppliers from connecting their supply hose outlet fittings to the fill fittings of gas tanks which they are not authorized to use.

BACKGROUND OF THE INVENTION

In the sale and supplying of liquefied petroleum gases, (LP-gases) such as propane or others to customers and in particular, residential customers, it has been a common practice for the supplier to provide a gas supply tank to the customer installed on the customer's premises at no up-front cost to the customer. The supplier will then gradually recover the cost of the tank by including it in the amount the customer pays for the gas delivered by the supplier. This arrangement is based on the concept that the tank is owned by the supplier that installs the tank and only the owner of the tank is permitted to fill the tank.

Some suppliers have adopted the practice of filling tanks owned by other suppliers and thereby obtaining the free use of another supplier's tank. This creates a situation where the tank owner is not only, being deprived of a way of recovering the cost of the tank which he has provided, but he may incur legal liability if an unauthorized supplier negligently fills the tank and causes an accident or explosion since he may be wrongfully blamed for the accident. To prevent this unauthorized use by suppliers who do not own the tanks, it is necessary to customize the fill fitting of the tank so that it will not be compatible with the outlet end coupling of a fill hose of suppliers other than the tank owner.

An example of one type of customized or coded coupling is shown in U.S. Pat. No. 4,665,960 (Brzezicki et al.) which uses nuts having a number of different configurations of projections thereon with each configuration matching a certain groove configuration on a mating member. The coupling cannot be connected together unless the matching combination of projections and groove configurations is used. This coupling is used to assure that coupling parts intended for one particular type of fluid cannot be mated with coupling parts intended for other fluids. This type of coupling would not, however be compatible for use with existing fill fittings for tanks such as those used for LP-gases such as propane and would be more complex than necessary where a simple customizing adapter is needed to convert a standard fill fitting to a custom fitting.

One of the unique problems encountered in customizing fill fittings for tanks containing LP-gases is that once the tank has been filled and substantially emptied there is still some gas under pressure within the tank making it unsafe or impractical to remove and replace the fill fitting. It is therefore necessary to be able to customize the fitting by covering the standard male threads of the tank fitting with an adapter which provides non-standard male threads which a standard hose coupling cannot be connected to. It is also important to provide a tamper-proof adapter which cannot be removed from the fill fitting without damaging the standard male threads on the fitting so that they are no longer usable by an unauthorized supplier.

OBJECTS OF THE INVENTION

It is a primary object of this invention to provide a simple inexpensive adapter which will convert a standard threaded fill fitting on a LP-gas tank to a non-standard threaded fitting which will only accept a hose coupling with mating non-standard threads.

Another object of this invention is to provide a customizing adapter for an LP-gas tank fill fitting, which adapter cannot be removed without damaging the standard threads on a fill fitting to make the fitting unusable by an unauthorized gas supplier.

A still further object of this invention is to provide a customizing adapter for an LP-gas tank fill fitting which can be easily installed on the fill fitting when the tank is at least partially filled with gas without any drilling or grinding which might create sparks causing a gas explosion.

These and other objects of the invention will become more fully apparent in the following specification and the attached drawings.

SUMMARY OF THE INVENTION

This invention is a customized threaded adapter for rendering a gas tank fill fitting usable only with a fill hose end fitting having a customized retaining collar with threads matching those on the adapter, the adapter comprising: a body member with a threaded hole therethrough with threads matching standard male threads on an outwardly extending nipple of a fill tank fitting, the body member having a non-standard exterior threaded portion which will only accept connection with a fill hose outlet end fitting retaining collar having matching non-standard female threads, and a means to securely fasten the adapter on the fill fitting nipple so that it cannot be removed without rendering the fill fitting unusable.

DESCRIPTION OF THE PREFERRED EMBODIMENTS

Figure 1:
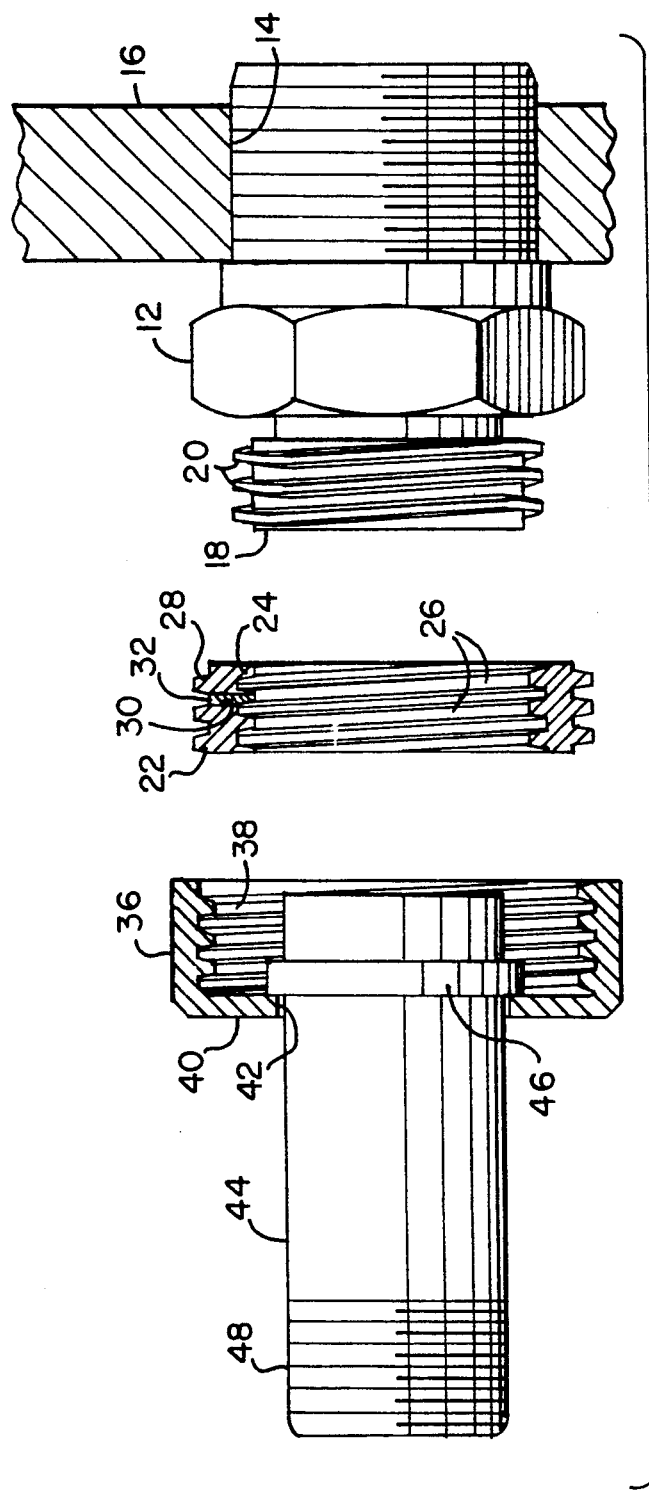
FIG. 1 is an exploded partially broken away side elevational view of an assembly of a gas tank fill fitting and a fill hose outlet end coupling with a customizing adapter of the invention positioned in its operative location in the assembly.

Referring now to FIG. 1 of the drawings a gas tank fill fitting and fill hose coupling assembly is indicated generally by the numeral 10. The assembly 10 includes a fill fitting 12 screwed into a threaded hole 14 of an LP-gas tank 16. The fill fitting 12 has an outwardly extending nipple 18 having standard 1¾" acme external or male threads 20 thereon. The internal structure of the fill fitting 12 will not be described in detail herein since it is a standard commercial fitting made by Rego Products and others specifically for use in LP-gas tanks. The fitting contains a double valve which opens to admit gas into a supply tank when a fill hose is connected thereto and gas under pressure is released from the hose to flow through the fill fitting. Once the fill gas pressure is turned off, the valves in the fill fitting close and prevent any gas from flowing from the tank through the fill fitting after the fill hose has been disconnected.

An adapter ring 22 has an axially extending hole 24 therethrough containing standard 1¾" acme internal or female threads 26. "Standard acme threads" as used herein, means American National Standard Acme Screws Threads, Standard ASME/ANSI B1.5-1988 as described on pages 1604 through 1607 of the Machinists Handbook, 24th Edition 1992, by Industrial Press. The adapter ring 22 also has non-standard or customized external acme threads extending around its circumference. The threads 26 may be non-standard in either pitch, size, or both.

The ring 22 has hole 30 extending radially therethrough from the outside diameter to the inside diameter.

Figure 2:
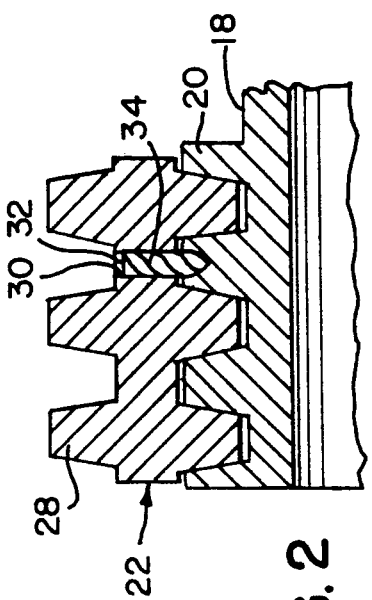
FIG. 2 is an enlarged fragmentary view showing a section through the adapter shown in FIG. 1 mounted on the fill fitting with a retaining pin in operative position.

As shown in FIG. 2, after the ring 22 is screwed onto the nipple 18 of the fitting 12, a pin 32 is driven through the hole 30 to make contact with the external threads 20 on the nipple 18 and secure the ring 22 on the fill fitting 12 so that it cannot be unscrewed from the fitting 12 without damaging the threads 20 and making them unusable for coupling a fill hose to the fitting 12. The pin 32 preferably has spiral threads and grooves such as the grooves 34 to aid in driving the pin 32 into the hole 30 and for retaining it in place after it has been driven in. As an alternative, the pin may also be knurled or have other surface treatment to cause it to remain more firmly in the hole 30. It is also preferable that the innermost end of the pin 32 be pointed so that it will more easily penetrate into the threads 20 and thereby cause more damage to the threads in case of an attempt to unscrew the adapter ring 22.

The non-standard customized external threads 28 are designed to receive a retaining collar 36 having non-standard customized internal threads 38 which mate with the non-standard customized threads 28 on the fill fitting 12. The collar 36 has an annular flange 40 which defines an axially extending hole 42 therethrough. A fill hose outlet end fitting 44 is passed through the hole 42. The fitting 44 has an annular rib 46 near its outlet end which engages the flange 40 and retains the collar 66 when it is screwed onto the adapter ring 22 to securely attach a fill hose (not shown) to the fill fitting 12. The fitting 44 has a threaded portion 48 which attaches to a fill hose valve (not shown) which in turn connects to a fill hose (not shown).

With regard to the assembly shown in FIG. 1, once the customized adapter ring 22 is screwed onto the fill fitting 12, and the pin 32 is driven into position to engage the threads 20, the ring 22 is left permanently on the fitting 12 to make it usable only by a supplier having a fill hose outlet coupling collar with customized threads which match the external threads 28 on the ring 22.

Figure 5:
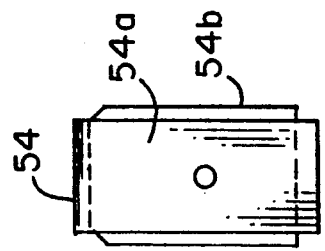
FIG. 5 is an enlarged front elevational view of a leaf spring used to resiliently mount the thread damaging tooth in the embodiment shown in FIGS. 3 and 4.
Figure 6:
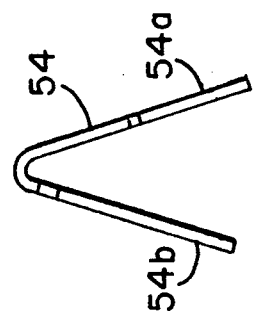
FIG. 6 is an enlarged profile view of the leaf spring shown in FIG. 5.
Figure 4:
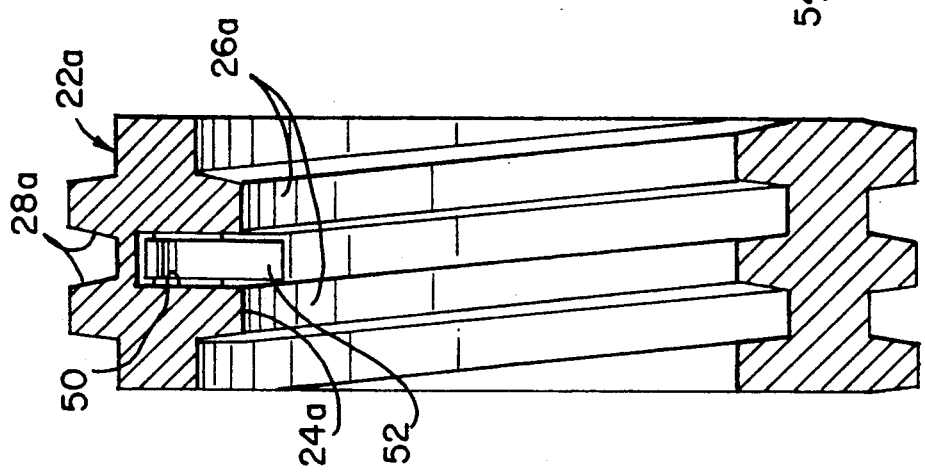
FIG. 4 is a cross-sectional view taken on line 4—4 of FIG. 3.
Figure 3:
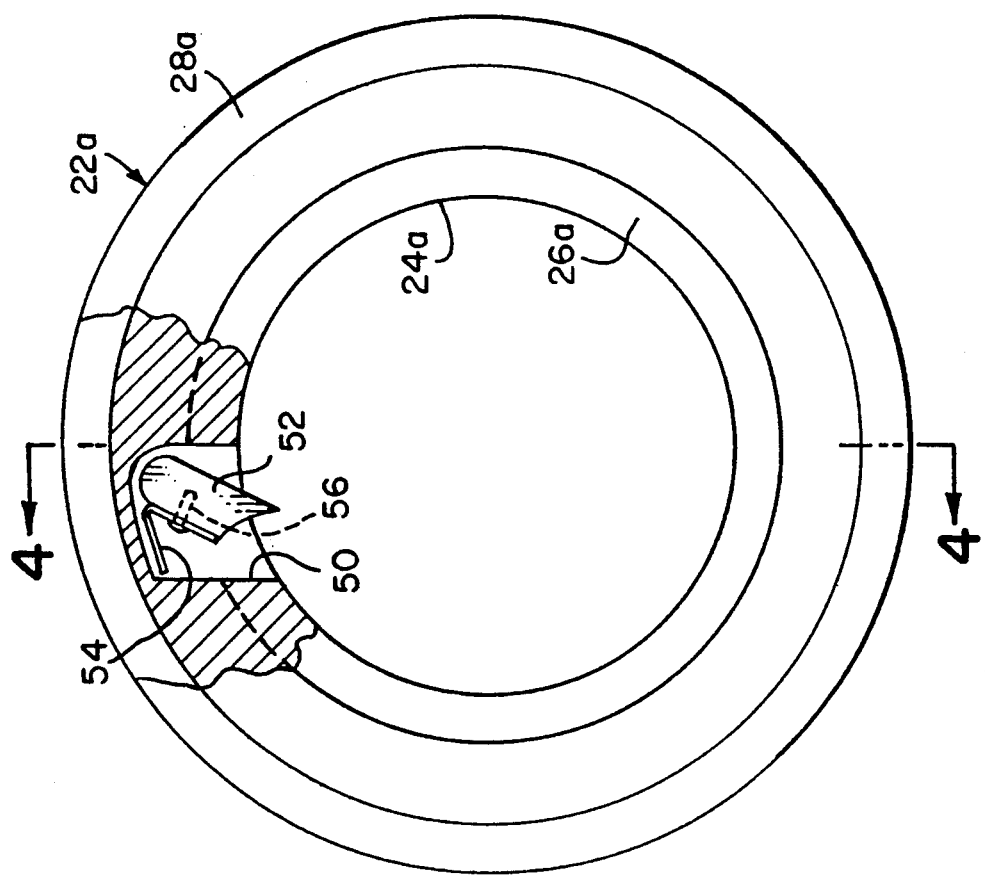
FIG. 3 is an enlarged partially broken away end view of an adapter ring having a different type of thread damaging retainer from that shown in the adapter ring in FIG. 1.

Referring now to FIGS. 3 and 4, an adapter ring 22a is similar to the ring 22 except that it has a different type of retaining means. The ring 22a has an axially extending hole 24a which contains internal standard threads 26a which match the standard external threads 20 on the fill fitting 12. The ring 22a has non-standard customized external threads 28a similar to the threads 28 on the ring 22 which match the threads on the collar in FIG. 1. Instead of the pin 32 shown in FIG. 1, the ring 22a has an inwardly facing slot 50 which opens into the hole 24a. Located within the slot 50 is a cutting tooth 52 attached to a leaf spring 54 by a rivet or by other suitable means. The leaf spring 54 has one tooth retaining portion 54a and a wider portion 54b which is wedged into the slot 50 to resiliently hold the tooth 52 therein as may be best seen in FIG. 5. The tooth 52 is shown in FIGS. 3 and 4 with a sharp point extending into the hole 24a. When the ring 22a is screwed onto a fill fitting by rotating it in a clockwise direction, the spring flexes and allows the tooth to be moved up into the recess 50 by the external threads on the fill fitting. If an attempt is made to unscrew the ring 22a from such fill fitting by rotating it in a counterclockwise direction the pointed end of the tooth 52 will dig into the external threads of the fill fitting and damage the threads to make them unusable if the adapter ring 22a is removed.

Figure 8:
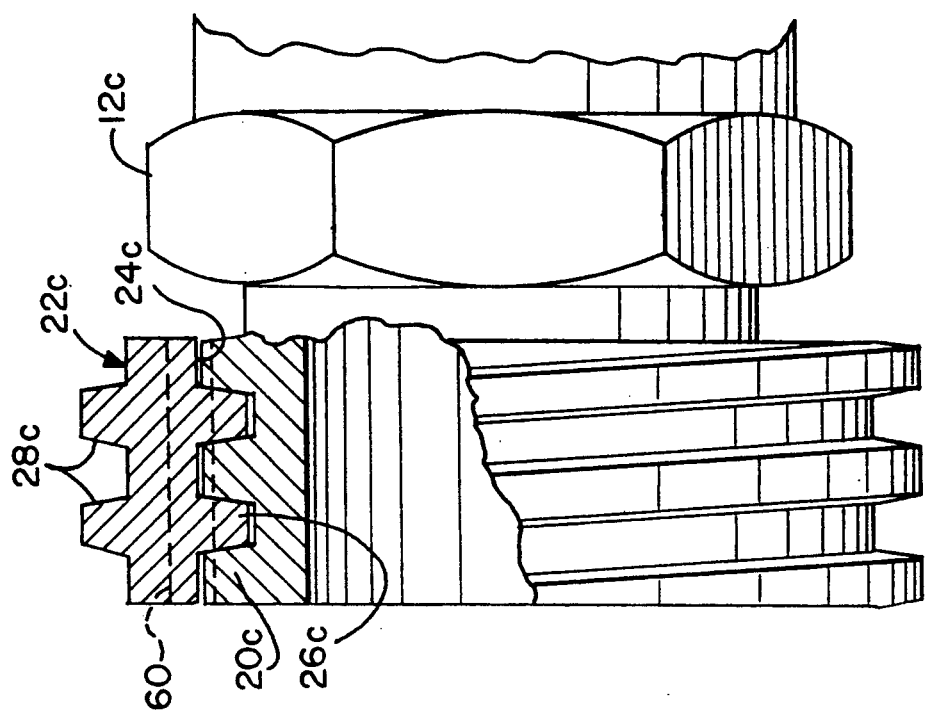
FIG. 8 is a partially broken away side view of the adapter ring shown in FIG. 7.
Figure 7:
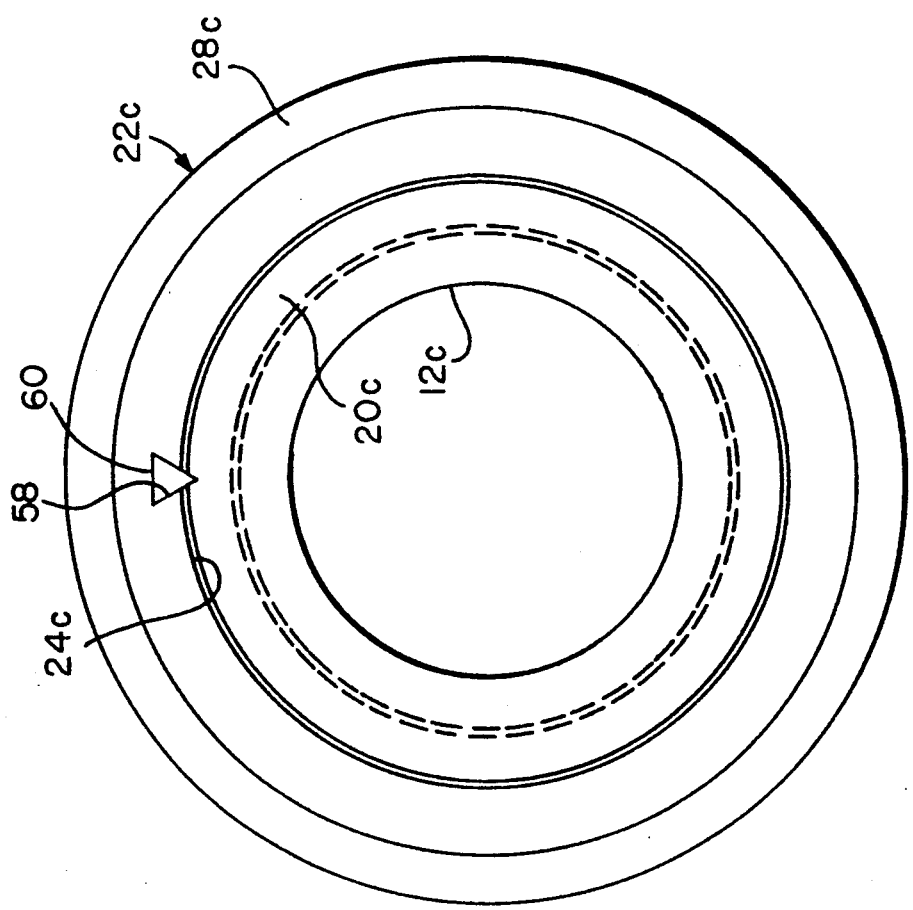
FIG. 7 is an enlarged end view of an adapter ring screwed onto a fill fitting and held in place on the fitting with a key type thread damaging retainer.

In FIGS. 7 and 8 another modification of the invention is shown in which an adapter ring 22c has an axial hole 24c therethrough with standard internal threads 26c which match external threads 20c on a fill fitting 12c. The ring 22c has non-standard customized external threads 28c which are similar to the threads 28 and 28a in earlier described modifications of the invention. The ring 22c has an axially extending substantially triangular shaped groove 58 which opens into the hole 24c. The groove 58 receives a triangular shaped key 60 with a small portion of one of the corners protruding into the hole 24c along the axial length of the key 60.

After the ring 22c is screwed onto the fitting 12c the key 60 is forcibly driven into the end of the groove 58 and the protruding corner of the key cuts a groove across the tops of the threads 20c as it passes across them and in effect creates a keyway across the threads. With the key 60 wedged into position between the ring 22c and the fitting 12c, any attempt to unscrew the ring 22c from the fitting 12c will damage the threads 20c and render them unusable for coupling a fill hose fitting.

The advantage to this embodiment and the others previously described is that they can be installed on a fill fitting already attached to a gas tank without the use of drills or other power equipment which might generate sparks and cause an explosion from any residue of gas in the tank.

It will be recognized that more than one of the thread damaging retainers shown herein can be used on a single adapter ring if it is desired to even more securely attach the ring to the fill fitting. Other types of thread damaging fasteners can also be used on the adapter ring without departing from the scope of the invention.

These and various other modifications can be made in the embodiments shown herein without departing from the scope of the invention.

I claim:

1. In combination with a gas tank fill fitting for attachment into a tank wall, which fitting has an outwardly projecting male threaded nipple for engaging matching female threads on a retaining collar of a fill hose outlet end fitting, to hold said end fitting in operative engagement with the fill fitting, both the male and female threads being a standard size and pitch, the improvement comprising:

(A) a customizing adapter member comprising a substantially annular body having an axially extending threaded hole therethrough with standard acme female internal threads which match the standard male threads on the nipple of the fill fitting to permit the adapter member to be screwed onto the fill fitting;

(B) said adapter member having customized non-standard male threads on its outer circumference to prohibit the connection thereto a filler hose end fitting having a retaining collar with standard acme female threads; and (C) thread damaging means of harder material than the nipple associated with the adapter and positioned to damage the male threads on the nipple of the fill fitting when the adapter member is forcibly unscrewed therefrom and thereby render the fill fitting unusable for connecting any fill hose fitting thereto.

2. The combination as claimed in claim 1 wherein the body of the adapter member has at least one radially extending hole therethrough and the thread damaging means is a pin driven through each such hole into contact with the threads on the nipple of the fill fitting after the adapter is screwed onto the nipple.

3. The combination as claimed in claim 1 wherein the body of the adapter member has at least one slot therein facing into the threaded hole therethrough and a spring biased cutting tooth positioned in the slot to remain in a retracted non-cutting position when the adapter is being screwed on the nipple of the fill fitting but adapted to move into a protruding position to engage and cut the threads on the nipple when the adapter is unscrewed therefrom.

4. The combination as claimed in claim 1 wherein the body of the adapter member has at least one axially extending groove therein facing into the threaded hole therethrough and the thread damaging means is a key driven into the grooves after the adapter member is screwed onto the nipple of the fill fitting and wherein the key protrudes beyond the groove to be in wedging contact with the male threads on the nipple of the fill fitting.

5. The combination as claimed in claim 4 wherein the axially extending groove is of substantially triangular shape and the key is of matching triangular shape with a corner portion of the key protruding beyond the groove and penetrating into the tops of the male threads on the fill fitting.

6. The combination as claimed in claim 1 wherein the threads on the outer circumference of the adapter member are inclined at a non-standard pitch angle that will only receive a hose outlet fitting retaining collar having threads with the same non-standard pitch angle.

7. The combination as claimed in claim 1 wherein the threads on the outer circumference of the adapter member are a non-standard size that will only receive a hose outlet fitting retaining collar having the same nonstandard size threads.

8. A customized threaded adapter for rendering a gas tank fill fitting usable only with a fill hose end fitting having a customized retaining collar with threads matching those on the adapter, said adapter comprising:

(A) a body member having a threaded hole extending therethrough with standard acme female threads which match male threads on an outwardly extending nipple of a fill tank fitting;

(B) said body member having an exterior male threaded portion with customized non-standard male threads which will only accept connection with a fill hose outlet end fitting retaining collar having a matching customized non-standard female threads; and (C) means to securely fasten the adapter on the fill fitting nipple so that it cannot be forcibly removed without rendering the fill fitting unusable, said means being made of harder material than the nipple.

9. The adapter as claimed in claim 8 wherein the body of the adapter has at least one hole extending transversely through a wall of the body member from the exterior thereof to the threaded hole and the means to fasten the adapter on the nipple is a pin driven through each such hole into contact with the threads on the nipple after the adapter is screwed onto the nipple.

10. The adapter as claimed in claim 8 wherein the body of the adapter has at least one slot therein facing into the threaded hole therethrough and a spring biased cutting tooth positioned in the slot to remain in a retracted non-cutting position when the adapter is being screwed on the nipple but adapted to move into a protruding position to engage and cut the threads on when the adapter is unscrewed from the nipple.

11. The adapter as claimed in claim 8 wherein the body of the adapter has at least one axially extending groove therein facing into the threaded hole therethrough and the thread damaging means is a key driven into the grooves after the adapter member is screwed onto the nipple of the fill fitting and wherein the key protrudes beyond the groove to be in wedging contact with the male threads on the nipple of the fill fitting.

12. The adapter as claimed in claim 8 wherein the axially extending groove is of substantially triangular shape and the key is of matching triangular shape with a corner portion of the key protruding beyond the groove and penetrating into the tops of the male threads on the fill fitting.

13. The adapter as claimed in claim 8 wherein the exterior male threads on the body of the adapter are inclined at a non-standard pitch angle that will only receive a hose outlet fitting retaining collar having threads with same non-standard pitch angle.

14. The adapter as claimed in claim 8 wherein the exterior male threads on the body of the adapter are a non-standard size that will only receive a hose outlet fitting retaining collar having the same non-standard size threads.

* * * * *